United States Patent [19]
Okada et al.

[11] Patent Number: 5,878,275
[45] Date of Patent: *Mar. 2, 1999

[54] INFORMATION PROCESSING APPARATUS WHICH DISCRIMINATES WHETHER OR NOT INPUT INFORMATION IS STORED IN MEMORY AND CONTROLLING THE SWITCHING FROM A FIRST CONTROL PROGRAM TO A SECOND CONTROL PROGRAM

[75] Inventors: Kunio Okada, Kawasaki; Yoshiaki Kawamura, Narashino; Yutaka Murakami; Haruo Fujita, both of Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 280,588

[22] Filed: Jul. 26, 1994

Related U.S. Application Data

[63] Continuation of Ser. No. 682,698, Apr. 9, 1991, abandoned.

[30] Foreign Application Priority Data

Apr. 12, 1990 [JP] Japan ................................. 2-95110

[51] Int. Cl.$^6$ .................................................. G06F 13/00
[52] U.S. Cl. .......................... 395/856; 395/800; 395/282; 395/570; 395/835; 327/1
[58] Field of Search .................................... 358/401, 500; 364/200, 300, 900, 523, 519; 365/230; 395/230, 101, 425, 725, 800, 500, 282, 570, 835, 836; 400/70, 61; 327/1

[56] References Cited

U.S. PATENT DOCUMENTS

| | | | |
|---|---|---|---|
| 4,630,231 | 12/1986 | Hirata et al. ............................. | 364/900 |
| 4,718,044 | 1/1988 | Matsuyama .............................. | 365/230 |
| 4,742,483 | 5/1988 | Morrell .................................... | 364/900 |
| 4,763,281 | 8/1988 | Arakawa .................................. | 364/523 |
| 4,811,052 | 3/1989 | Yamakawa et al. ..................... | 364/200 |
| 4,825,404 | 4/1989 | Theus ...................................... | 364/900 |
| 4,826,332 | 5/1989 | Ukai et al. ............................... | 400/70 |
| 4,853,844 | 8/1989 | Kono ....................................... | 364/200 |
| 4,878,123 | 10/1989 | Miura et al. ............................. | 358/401 |
| 4,902,146 | 2/1990 | Ishikawa .................................. | 400/61 |
| 4,905,200 | 2/1990 | Pidsosny et al. ........................ | 364/300 |
| 4,916,607 | 4/1990 | Teraichi .................................. | 364/200 |
| 4,926,347 | 5/1990 | Uchida et al. ........................... | 364/519 |
| 4,926,373 | 5/1990 | Takenaka ................................ | 364/900 |
| 4,949,301 | 8/1990 | Joshi et al. .............................. | 364/900 |
| 4,951,248 | 8/1990 | Lynch ...................................... | 364/900 |
| 5,042,003 | 8/1991 | Belt et al. ................................ | 364/900 |
| 5,155,804 | 10/1992 | Matsuzaki et al. ..................... | 395/101 |
| 5,270,805 | 12/1993 | Abe et al. ................................ | 358/500 |
| 5,355,489 | 10/1994 | Bealkowski et al. ................... | 395/500 |

FOREIGN PATENT DOCUMENTS

| | | |
|---|---|---|
| 0181949 | 5/1986 | European Pat. Off. . |
| A-0322727 | 7/1989 | European Pat. Off. . |
| 2627303 | 8/1989 | France . |
| 2738696 | 1/1998 | Japan . |
| 2211971 | 7/1989 | United Kingdom . |

*Primary Examiner*—Thomas C. Lee
*Assistant Examiner*—Chien Yuan
*Attorney, Agent, or Firm*—Fitzpatrick Cella Harper & Scinto

[57] ABSTRACT

There is disclosed an information processing apparatus, such as a printer, capable of selectively using plural control programs by utilizing an external memory, such as a program cartridge, containing additional programs. When a switching of control program is requested for example by a switch, the start address of the requested program is indirectly obtained by referring to a fixed address of the memory cartridge containing the requested program.

60 Claims, 14 Drawing Sheets

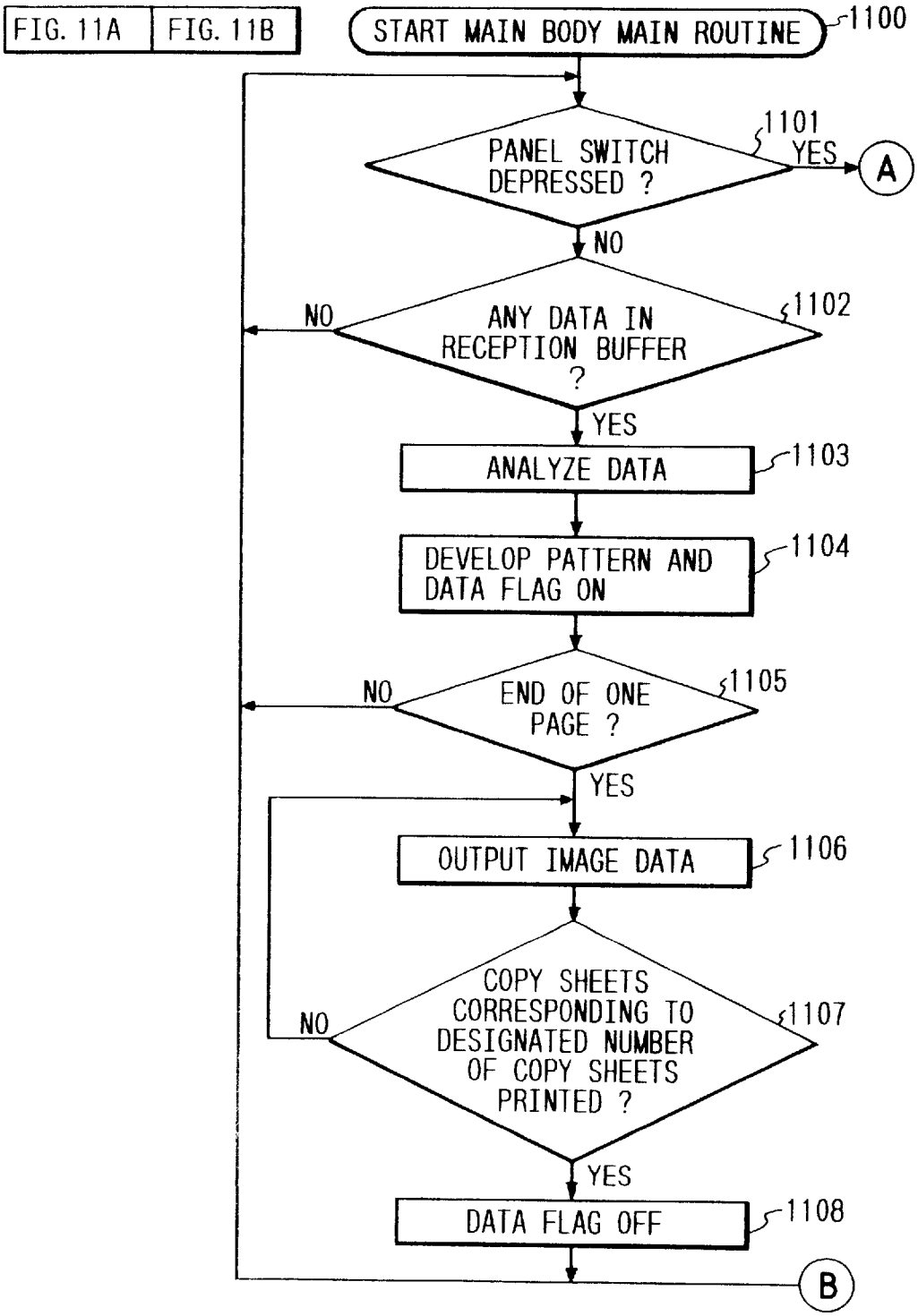

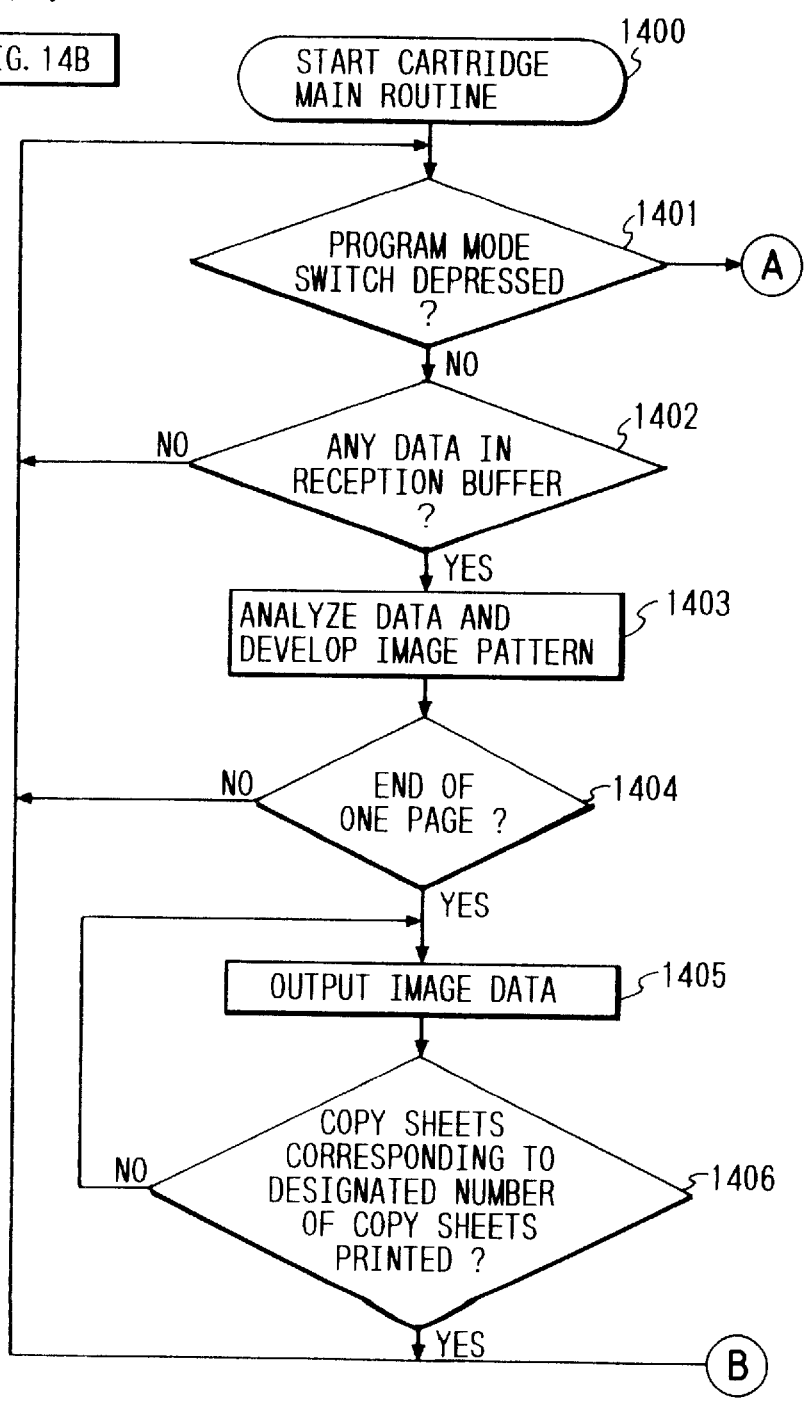

INFORMATION PROCESSING APPARATUS WHICH DISCRIMINATES WHETHER OR NOT INPUT INFORMATION IS STORED IN MEMORY AND CONTROLLING THE SWITCHING FROM A FIRST CONTROL PROGRAM TO A SECOND CONTROL PROGRAM

This application is a continuation of application Ser. No. 07/682,698 filed Apr. 9, 1991, now abandoned.

BACKGROUND OF THE INVENTION

1. Field of the Invention

The present invention relates to an information processing apparatus for processing information according to a predetermined control program.

2. Related Background Art

In a printing apparatus which is one of the conventionally known apparatus of this kind, a predetermined control program is stored for example in an internal ROM, for controlling the apparatus.

Also in a conventional second printing apparatus, a command analyzing routine is separated from the stored program and stored in a detachable program memory medium, and plural command analyzing routines are selectively called by the main routine of a control program incorporated in the main body of the printing apparatus, whereby an apparatus can effect the printing operation according to plural command systems.

Also in a conventionally known third printing apparatus, a control program, independently executable from the control program incorporated in the printing apparatus, is stored in a detachable program cartridge, and the start-up process of the apparatus selects either to execute the control program stored on the program cartridge or to execute the incorporated program.

The program cartridge is common in shape with the font cartridge storing character dot patterns, and such cartridges have identification information indicating "program" or "font information". The incorporated control program shifts the control to the program of the cartridge only when it bears the identification information for "program".

However, the first conventional example mentioned above can only execute a predetermined control program, and is unable to effect the printing operation according to any other command system.

The second conventional example can adapt itself to other plural command systems, but is incapable of processes other than command analysis (changes in the control of apparatus, such as a change in the hand shake process with a data source such as a host computer, or a change or an addition in the sheet handling of the printing mechanism in a jamming process), because the main routine of the control program is incorporated in the apparatus. For this reason there is inevitably a limitation in the utilization of various printing functions by an apparatus.

Also in the third conventional example, once the execution of a control program is started, the switching of program is difficult because the other control program is so designed as to function independently from the one in execution.

Besides, in the third example, the control program on the program cartridge, which functions properly on a certain apparatus, may not function properly on another apparatus because of the difference in hardware. Consequently there is a danger that a program which does not function properly may be executed because no means is provided for identifying whether the program is proper or not.

Also in case there are certain differences in the control among plural printing apparatus, no means is provided for identifying the properly functioning programs among plural cartridges provided for each apparatus, so that an improper control program may be executed on a certain apparatus.

SUMMARY OF THE INVENTION

An object of the present invention is to provide an information processing apparatus capable of constantly executing a proper program.

Another object of the present invention is to provide an information processing apparatus capable of bidirectional program switching between an incorporated control program and a control program supplied from a detachable memory medium.

Still another object of the present invention is to provide an information processing apparatus capable of checking whether the program is switchable, in response to a request for program switching.

Still another object of the present invention is to provide an information processing apparatus capable of preventing data entry in the course of program switching.

Still another object of the present invention is to provide an information processing apparatus capable of checking whether the objective program to be switched is proper, in response to a request for program switching.

According to one aspect, the present invention which achieves these objectives relates to an information processing apparatus comprising input means for entering information; first memory means storing a first control program; second memory means storing a second control program; selection means for selecting the first or second control program; process means for processing the information, entered by the input means, according to the control program selected by the selection means; request means capable of requesting the switching to the second control program in a state in which the first control program is selected, and means for indirectly obtaining the start address of the second control program, by referring to the fixed address of the second memory means, in order to switch the control program in response to the request.

According to another aspect, the present invention which achieves these objectives relates to an information processing apparatus comprising input means for entering information; internal memory means storing a control program; plural detachable external memory means each storing a control program; selection means for selecting one of the control programs; process means for processing the information, entered from the input means, according to the control program selected by the selection means; request means capable of requesting, in a state in which one of the control programs is selected, the switching to another of the control programs; and means for indirectly obtaining the start address of the requested control program, by referring to the fixed address of the memory means storing the requested control program, in order to switch the control program in response to the request.

According to still another aspect, the present invention which achieves these objectives relates to an information processing apparatus comprising input means for entering information; internal memory means storing a control program; detachable external memory means storing a control program; selection means for selecting one of the control programs; process means for processing the information, entered from the input means, according to the control program selected by the selection means; request means capable of requesting, in a state in which one of the control programs is selected, the switching to another of the control programs; and discrimination means for discriminating whether the control program is switchable in response to the request.

According to still another aspect, the present invention which achieves these objectives relates to an information processing apparatus comprising input means for entering information; first memory means storing a first control program; second memory means storing a second control program; selection means for selecting the first or second control program; process means for processing the information, entered from the input means, according to the control program selected by the selection means; request means capable of requesting, in a state in which the first control program is selected, the switching to the second control program; and inhibition means for inhibiting the information entry into the input means prior to the switching operation of the control program in response to the request.

According to still another aspect, the present invention which achieves these objectives relates to an information processing apparatus comprising input means for entering information; internal memory means storing a control program; detachable external memory means storing plural control programs; selection means for selecting one of the control programs; process means for processing the information, entered from the input means, according to the control program selected by the selection means; request means capable of requesting, in a state in which the control program stored in the internal memory means is selected, the switching to one of the control programs stored in the external memory means; search means for searching identification information corresponding to the requested control program, on the external memory means; and means for indirectly obtaining the start address of the requested control program, by referring to a relative address to be determined from a fixed displacement from the storage position of the identification information when the information is searched by the search means.

Other objectives and advantages besides those discussed above shall become apparent to those skilled in the art from the description of a preferred embodiment of the invention which follows. In the description, reference is made to accompanying drawings, which form a part hereof and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Now the present invention will be clarified in detail by a printing apparatus constituting an embodiment thereof, shown in the attached drawings.

Embodiment 1

Figure 1:
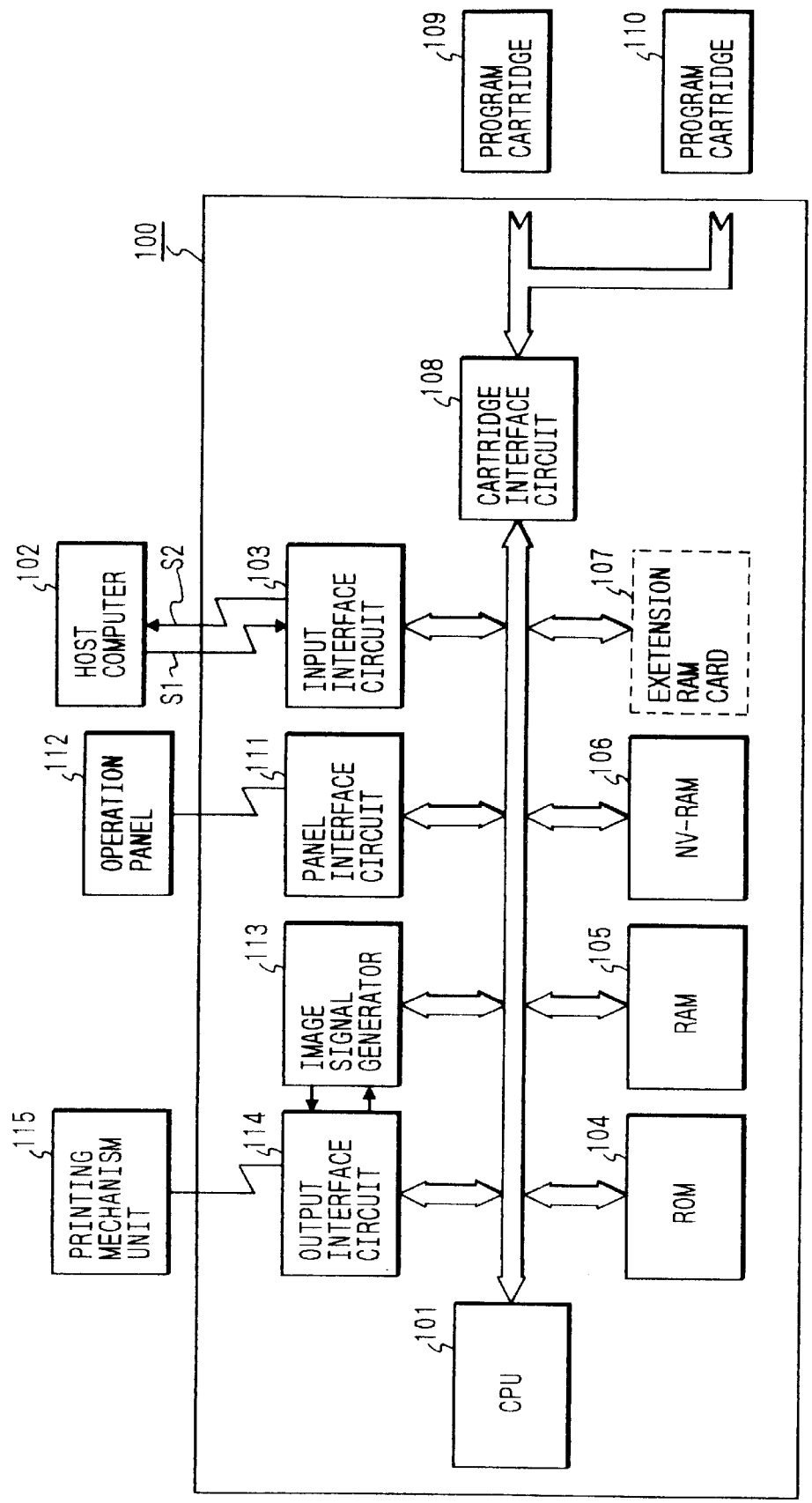
FIG. 1 is a block diagram of a control unit in an embodiment of the present invention.

FIG. 1 is a block diagram of a control unit 100 in a laser beam printer constituting an embodiment of the present invention. In FIG. 1 there are shown a host computer 102 serving as a data source; a CPU 101 controlling the entire apparatus; and an input interface circuit 103 for entering data from the host computer 102 through an input signal line S1. The circuit 103 also turns on/off a busy signal line S2 according to instructions from the CPU 101, thereby informing the host computer of the data transmission disabled/enabled state.

Figure 2:
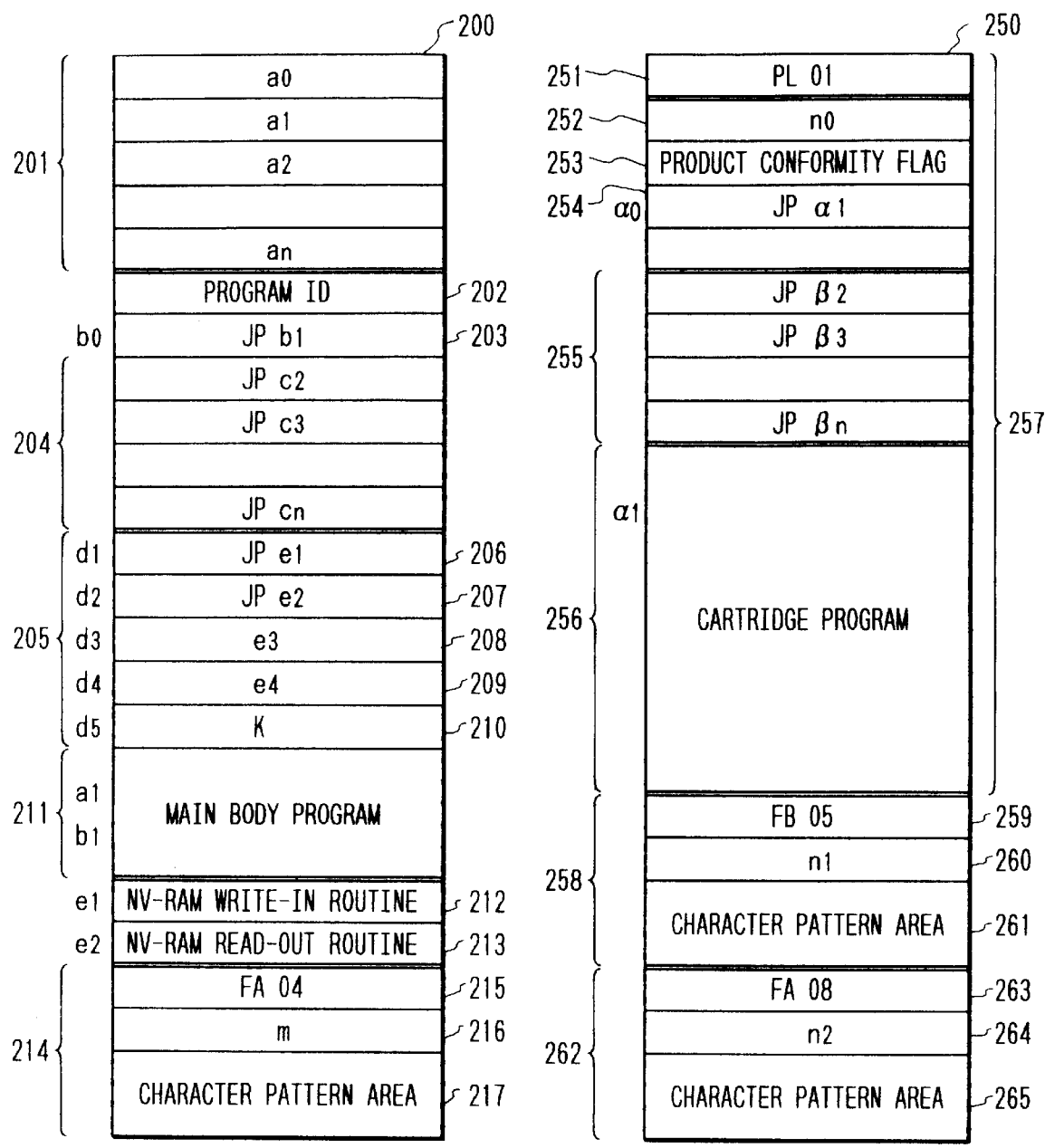
FIG. 2 is a view showing storage format of a control program in a ROM.

A ROM 104 is provided for storing control program and character patterns of the laser beam printer. The storage format of the ROM is shown in FIG. 2, and the flow of the control sequence thereof is shown in FIGS. 10, 11A, 11B and 12.

A RAM 105 is provided for use in the control program to be explained later (FIGS. 10 to 14A, 14B), and the details of this RAM will be explained later in relation to FIG. 5.

A non-volatile RAM 106 (hereinafter represented as NVRAM), composed of an ordinary EEPROM (electrically erasable programmable ROM), is provided for storing information to be preserved after the power supply is cut off. The details of this RAM will be explained later in relation to FIG. 7.

An extension RAM card 307 is used for expanding the capacity of the RAM 105.

A cartridge interface circuit 108 constitutes a hardware interface among a first program cartridge 109, a second program cartridge 110 and the CPU 101, and controls the access to the ROM's on the cartridges from the CPU 101. Each of the program cartridges 109, 110 is provided with a ROM board consisting of plural ROM's and related devices. The ROM's on the program cartridge store a control program different from that stored in the ROM 104, and character patterns. Its storage format is shown in FIG. 2, and the flow of control sequence will be explained later in relation to FIGS. 13, 14A and 14B. These program cartridges 109, 110 are detachably mounted, as shown in FIG. 15, on two cartridge connectors 1501, 1502 provided on the main body of the laser beam printer. It is assumed in the present embodiment that the first program cartridge 109 is mounted on the cartridge connector 1501 at left, and the second program cartridge 110 is mounted on the connector 1502 at right.

A panel interface circuit 111, for input/output of the signals of an operation panel 112 to or from the CPU 101, which turns on light-emitting diodes on the operation panel and senses the state of switches thereon through the circuit.

An operation panel 112 is provided on the present laser beam printer, and its structure will be explained later in relation to FIG. 9.

An image signal generator 113 is provided for converting image data of a page, developed on a page buffer 517 to be explained later (cf. FIG. 5), into image signals and sending the image signals to a printing mechanism unit 115 in synchronization with synchronization signals therefrom.

An output interface circuit 114 is provided for signal input/output between the control unit 100 and the printing mechanism unit 115.

A printing mechanism unit 115 of the present laser beam printer is designed to effect a printing process consisting of sheet feeding, generation of a laser beam, transfer and fixation of an image onto the sheet etc. in response to the image signals.

Because of the above-explained structure, the present printer is capable of selectively using one of three different control programs, namely the control program on the ROM 104, that on the first program cartridge 109 and that on the second program cartridge 110.

FIG. 2 shows the format of storage in the ROM 104 or in the ROM on the program cartridges 109, 110.

Hereinafter the control program provided in the main body of the printer will be called the main body program, and the control programs stored in the detachable program cartridges 109, 110 will be collectively called cartridge programs. Further, the control program stored in the first program cartridge will be called the cartridge program 0, while that in the second cartridge will be called the cartridge program 1.

In a storage format 200 of the main body program shown in FIG. 2, 201 indicates an interruption vector of the CPU 101, which makes accesses, in succession from address 0, to a stack pointer initial address $a_0$, a program start address $a_1$, various interruption start addresses $a_2$–$a_n$. The addresses $a_2$–$a_n$ are sequentially assigned in an initial area 501 of the RAM 105 shown in FIG. 5.

An identification name 202 of the main body program consists of a two-digit number specific to each control program, and is called "program ID".

An area 203 for storing a main body program re-start address, stores a jump command (to a restart address $b_1$) at the switching from a cartridge program to the main body program. The area is fixed assigned to an address $b_0$.

A table 204 is provided for interruption vectors for the main body program. The main body program is provided with interruption routines respectively starting from $c_2$, $c_3$, ..., $c_n$ for various interruption processes, and jump commands for these interruption routines are provided on the interruption vector table 204.

An external routine call table 205 is provided for calling programs (subroutines) provided on the ROM 104 from the cartridge program. In the present embodiment there are provided subroutines for writing in and reading from the NVRAM 106.

In the table 205, an area 206 stores a jump address $e_1$ to the NVRAM writing routine 212, and is fixedly assigned at an address $d_1$. An area 207 stores a jump address $e_2$ to the NVRAM reading routine 213, and is fixedly assigned at an address $d_2$. An area 208 is provided for designating the writing or reading address of the NVRAM in the NVRAM writing routine 212 or the NVRAM reading routine 213, and stores an address $e_3$ on the RAM 104, which indicates an address 507 for writing into or reading from the NVRAM. Similarly an area 209 is provided for designating an area for giving a value to be written to the NVRAM writing routine 212 or receiving a value to be received from the NVRAM reading routine 213, by an address $e_4$ on the RAM 104 stored in this area 209 or namely a NVRAM set value 508. An area 210 indicates the total capacity (K bytes) of the RAM area 506 used in the NVRAM writing routine 212 or in the NVRAM reading routine 213.

An area 506 of K bytes is prepared on the RAM, starting from an NVRAM address designating area 507, for NVRAM writing and reading, and this area 506 is used separately from the RAM area used for the main body program and the cartridge program.

Figure 10:
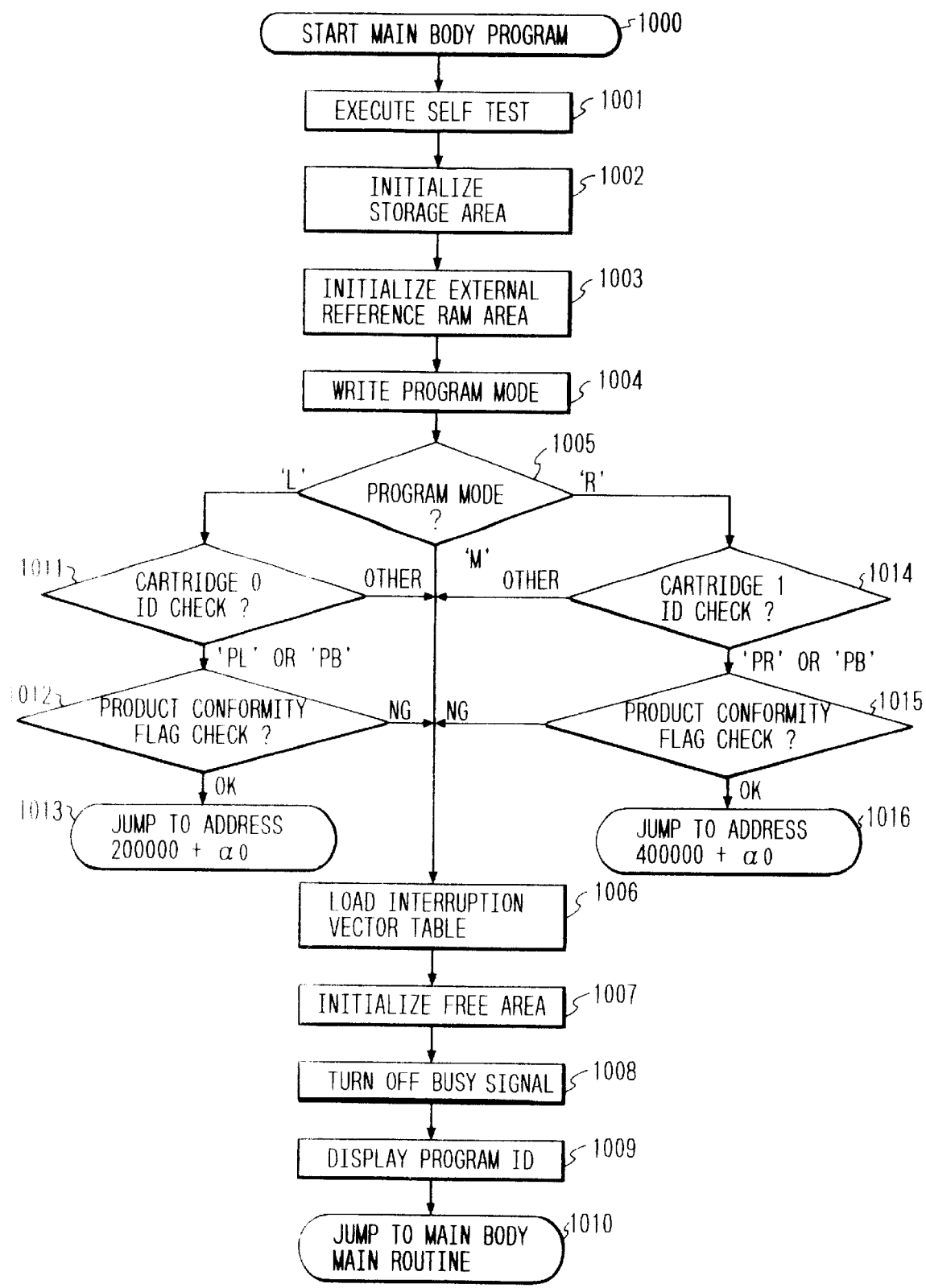
FIGS. 10, 11 which comprises of 11A and 11B, and 12 are flow charts of a program of the main body.
Figure 11B:
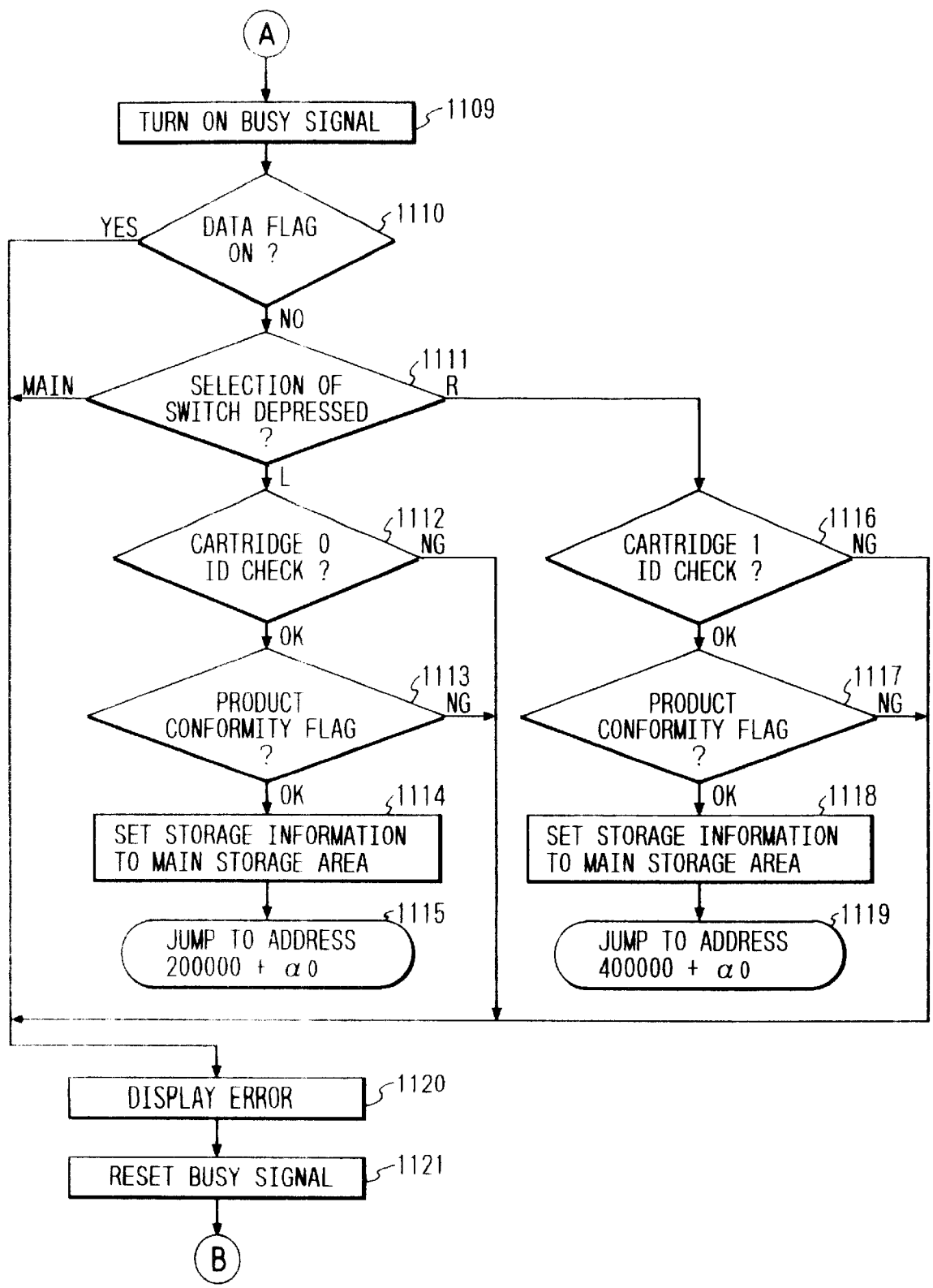
Figure 12:
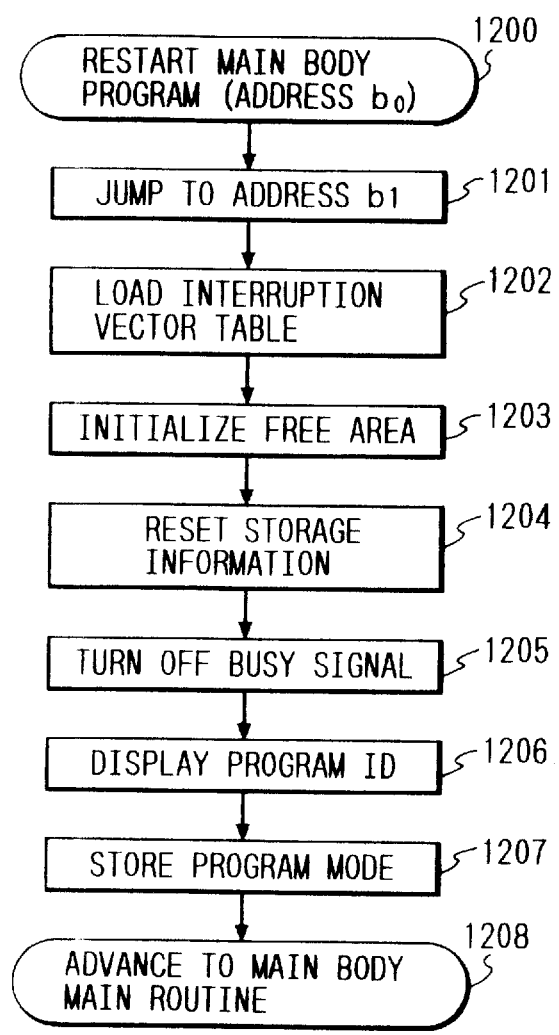

An area 211 is used for storing the main body program shown in FIGS. 10 to 12.

An area 212 is used for storing the NVRAM writing routine, and an area 213 is used for storing the NVRAM reading routine. A font area 214 stores character dot patterns corresponding to the character codes entered from the host computer 102, and consists of a font identification area 215, an area 216 storing a font capacity m indicating the total capacity of the font area 214, and a character pattern area 217 storing the character dot pattern themselves.

In the above-explained storage format 200, the areas 201–205 are assigned to fixed addresses starting from the address 0 on the ROM 104, and the cartridge program indirectly refers to the main body program 211 or the externally referred routines 212, 213 through the contents of these fixed addresses. Consequently, even when the addresses on the ROM 104 are varied due to changes in the area 211 or ensuing areas for example by a modification in the program, the content of the cartridge program can be maintained unchanged by correcting the contents of the areas 201–205 according to such variation.

Figure 3:
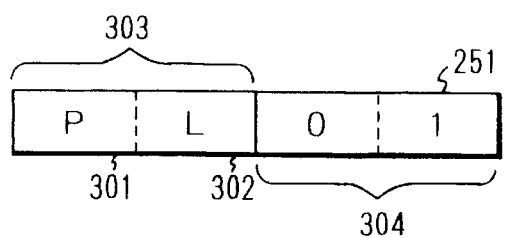
FIG. 3 is a view of a cartridge identification area shown in FIG. 2.

250 indicates the storage format of the cartridge program, wherein provided is a cartridge identification area 251 of which structure is shown in FIG. 3. The area is composed of 4 bytes, in which a cartridge type area 301 contains 'P' or 'F'. 'P' indicates that the ensuing area contains the cartridge program, while 'F' indicates that the ensuing area contains font (character patterns).

In FIG. 3, a cartridge sub type area 302 contains 'L', 'R' or 'B' in case the cartridge type area 301 contains 'P'. 'L' indicates a cartridge program exclusive for the first program cartridge 109, while 'R' indicates a cartridge program exclusive for the second program cartridge 110, and 'B' indicates a cartridge program commonly usable for the first and second program cartridges.

As the first and second program cartridges have difference address areas as will be later shown in FIG. 8, the cartridge program for each address area is identified by the cartridge sub type area 302. The code 'B' is applicable for example to a cartridge program not dependent on the address area by defining all the ROM area by relative addresses.

In case the cartridge type area 301 contains 'F', the cartridge sub type area 302 is used as a discriminator for sub-classification of the font. In the present embodiment, 'A' is defined as the discriminator representing the font exclusive for the main body program, while 'B', 'C', 'D', ... are defined as discriminators for the fonts exclusive for various cartridge programs.

The cartridge type 301 and the cartridge sub type 302 are collectively called the cartridge ID code 303. A cartridge ID number 304, consisting of a two-digit number, is a discriminator (identifier) attached to each cartridge program or font.

A cartridge capacity area 252 stores the total capacity $n_0$ of a cartridge program related area 257.

Figure 4:
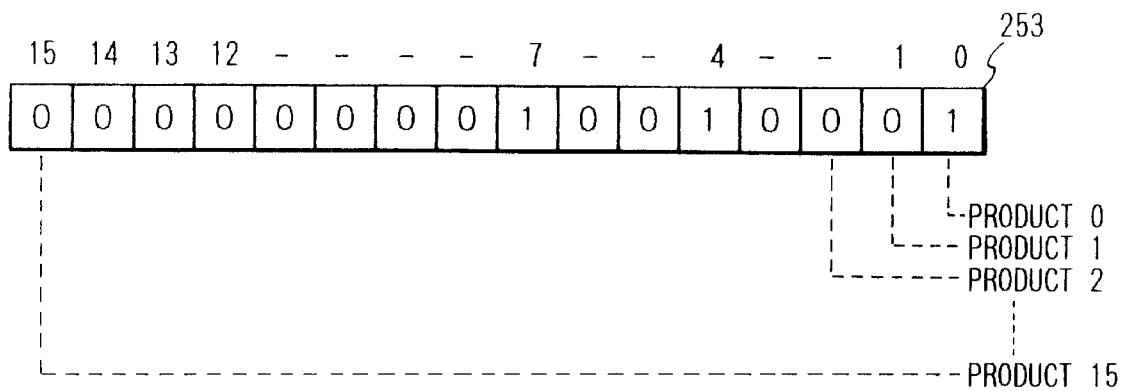
FIG. 4 is a view of a product conformity flag shown in FIG. 2.

An area 253 stores information called the product conformity flag. This flag indicates the compatibility of the program to the products in a series of printers, and is composed of 16 independent flags of one bit each, as shown in FIG. 4, wherein each bit represents a product in the product series (including future products), and '1' and '0' respectively represent compatible and incompatible.

The compatibility or incompatibility is determined at the preparation of the cartridge program, in consideration of the hardware structure of the control unit 100 of each product, the main body program incorporated therein and the supply status of the externally referred routine 205. A cartridge program start address area 254 stores a jump command (to a start address $\alpha_1$) at the switching from the main body program to a cartridge program. This area is assigned to a fixed address $\alpha_0$.

An interruption vector table 255 for the cartridge program has a similar structure to that of the interruption vector table 204 for the main body program. On the cartridge program there are provided interruption routines respectively starting from $\beta_2, \beta_3, \ldots, \beta_n$ for various interruption processes, and jump commands to these interruption routines are provided in said interruption vector table 255.

Figure 13:
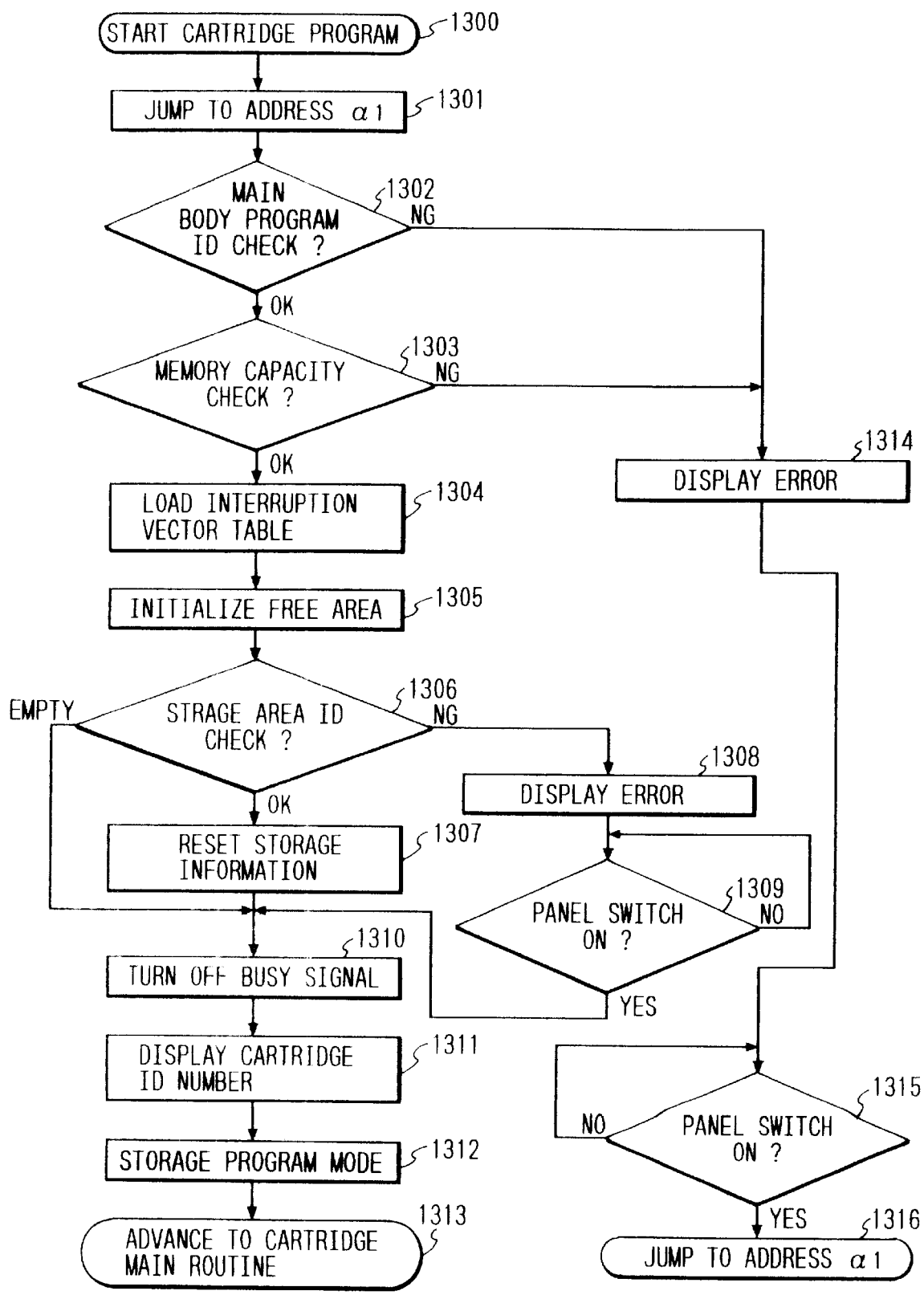
FIGS. 13 and 14 which comprises of 14A and 14B, are flow charts of a cartridge program.
Figure 14B:
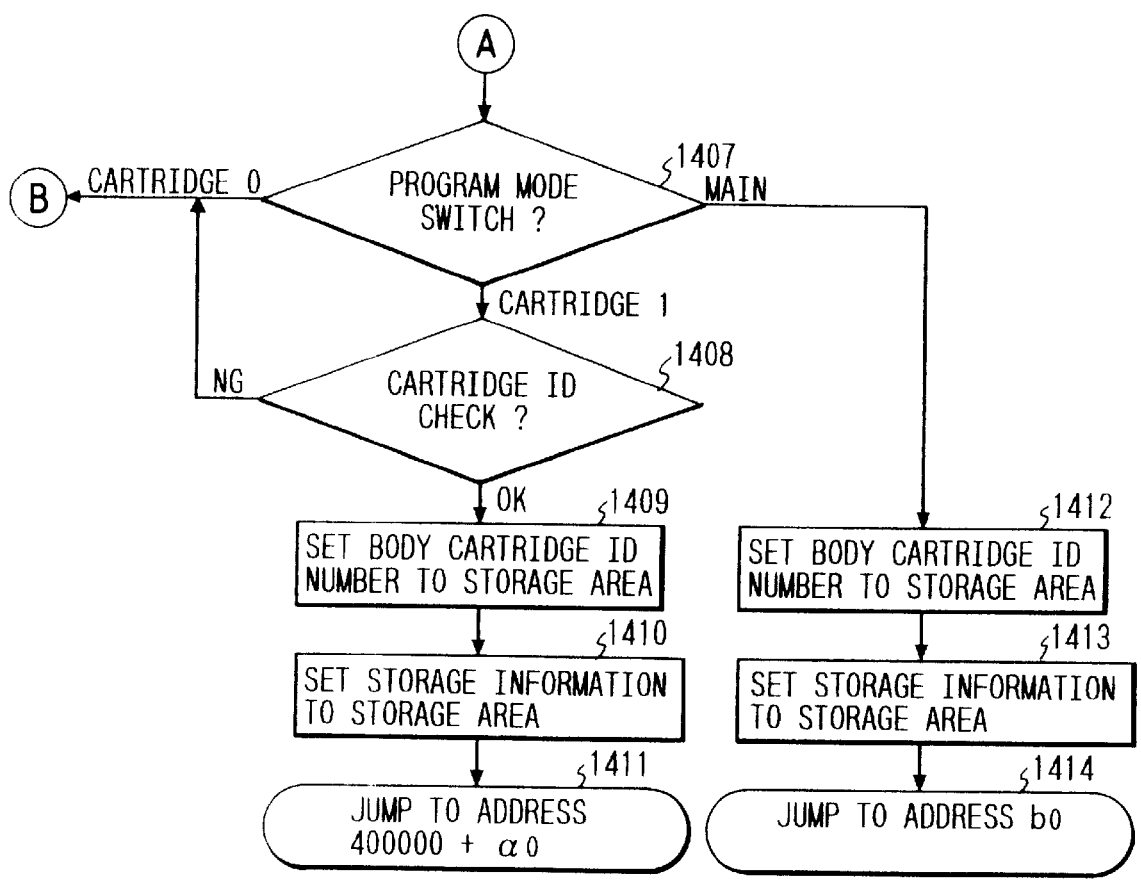
Figure 15:
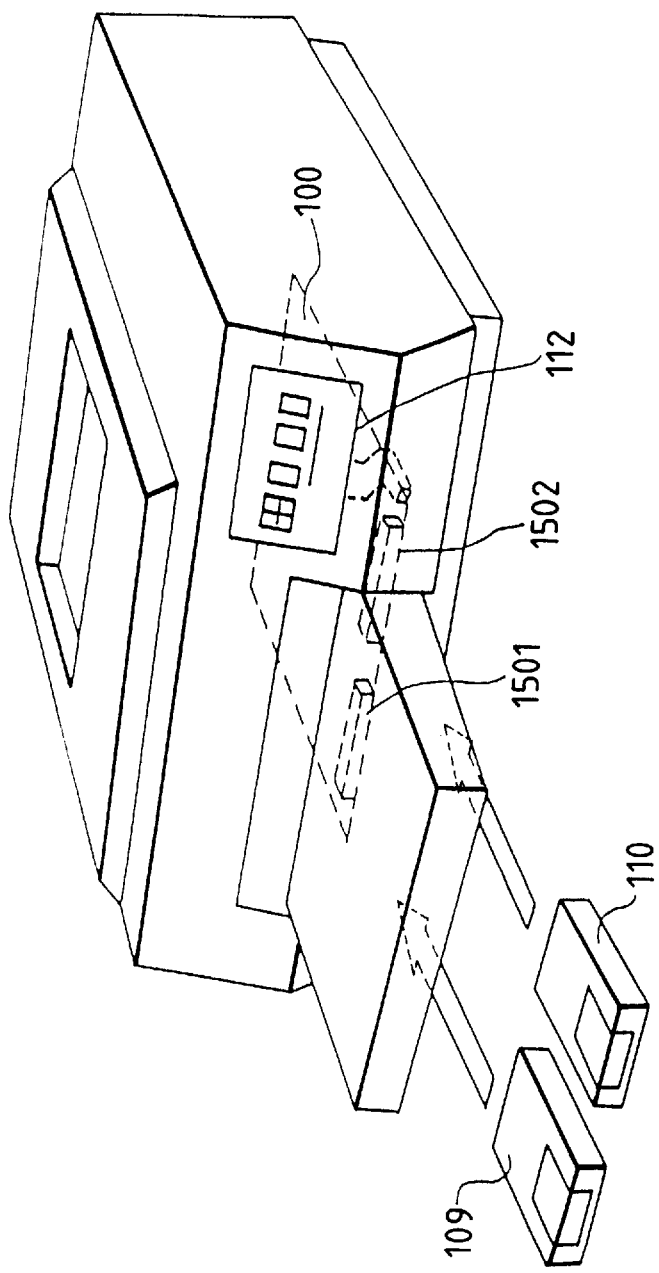
FIG. 15 is an external view of a laser beam printer embodying the present invention.

A cartridge program area 256 stores a cartridge program shown in FIGS. 13, 14A and 14B.

A font area 258 of the same format as the aforementioned font area 214 stores the character patterns for the cartridge program. A cartridge identification area 259 for the font area has a same format as the aforementioned cartridge identification area 251. The font for the cartridge program is identified by 'FB' in the cartridge ID code 303.

A cartridge capacity area 260 stores the total capacity $n_1$ of the font area 258. A character pattern area 261 stores the character dot patterns themselves used in the cartridge program.

A font area 262, same in format as the aforementioned font area 258, stores character patterns for the additional characters for the main body program. A cartridge identification area 263 therefor stores a cartridge ID code 303 'FA' representing a font for the main body program. An area 264 stores the total capacity $n_2$ of the font area 262, and an area 265 stores character patterns.

Figure 5:
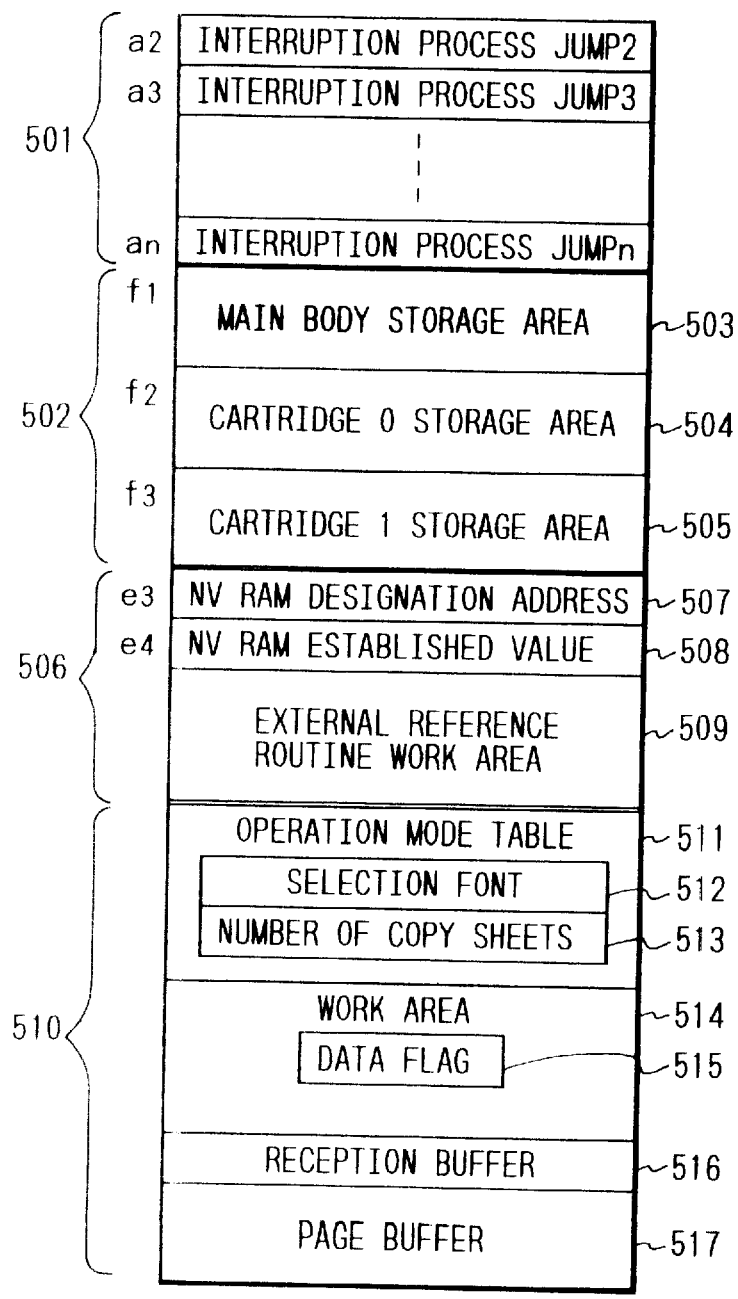
FIG. 5 is a view showing structure of RAM data.

FIG. 5 shows the data structure on the RAM 105 (FIG. 1). An itnerruption jump table 501, assigned to fixed addresses $a_2$–$a_n$ on the RAM, is copied from the itnerruption vector table 204 on the ROM 104 of the main body, at the start or re-start of the main body program, or from the interruption vector table on the program cartridge at the start of the cartridge program. The CPU interruption vectors 201 are directed to the addresses $a_2, a_3, \ldots, a_n$ on the RAM 105, so that the interruption routines of each control program are rendered usable by re-writing the area 501 at the start (or re-start) of the control program.

An area 502 is used for storing necessary information at the switching of the control program to another, and consists of a main body storage area 503, a cartridge 0 storage area 504 and a cartridge 1 storage area 504 for respective control programs. These areas are fixed, respectively starting from fixed addresses $f_1, f_2, f_3$ on the RAM 105.

An external reference RAM area 506 is used by the NVRAM write-in routine and the NVRAM read-out routine defined as external reference routines. A top portion of the area is used for the data transfer between the external reference routines and the calling control program, and consists of an NVRAM address designation area 507 for designating the read/write address of the NVRAM, and an NVRAM established value area 508 to be used for designating the value to be written into the NVRAM or for the transfer of the value read from the NVRAM. The addresses $e_3, e_4$ of the NVRAM address designation area 507 and NVRAM established value area 508 are accessed indirectly through the external reference routine calling table 205 as explained before. A work RAM area 509 is used for flag variables internally by the NVRAM write-in or read-out routine.

A RAM area 510, called free area, is used for program execution by the control program having the control right on the control unit 100, and areas 511–517 shown in FIG. 5 illustrate an example of the RAM structure. An operation mode table 511 stores the operation mode of the printer, instructed by command data from the host computer 102. In the illustrated example there are provided a selected font area 512, indicating the font to be used for character generation, selected from plural font areas provided on the RAM 105 and the program cartridges 109, 110, and a copy number area 513 indicating the number of copies to be made from an image of a page prepared in a page buffer 517 to be explained later. The selected font is indicated by the identification codes 215, 259, 263 at the start of the font areas.

A work area 514 for the control program is used for storing variables and flags. A data flag 515, set in the work area 514, indicates whether unprinted data remain in the page buffer 517 to be explained later.

A reception buffer 516 is used for temporarily storing data entered from the host computer 102 through the input interface circuit 103, by a reception interruption process of the control program.

A page buffer 517 is used for storing image data of a page, formed as bit map based on the data entered from the host computer.

Figure 6:
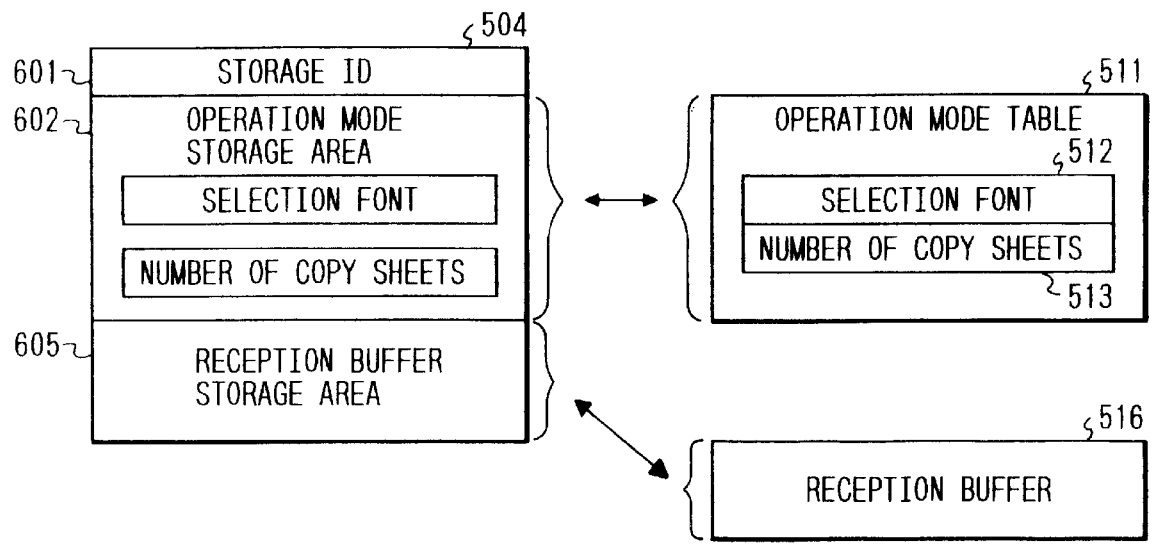
FIG. 6 is a view showing a storage area shown in FIG. 5.

FIG. 6 shows the structure of the storage area 502 shown in FIG. 5 and its relation to the free area. The cartridge 0 storage area 504, shown as an example of the storage area, includes following areas. An area 601 is used for setting a storage ID number, indicating the control program utilizing this storage area, among the programs of plural detachable first cartridges. The cartridge ID nubmer 304 is utilized as the storage ID number. An operation mode storage area 602 stores the content of the operation mode table 511 in the free area. A reception buffer storage area 605 stores the content of the reception buffer 516 in the free area.

Figure 7:
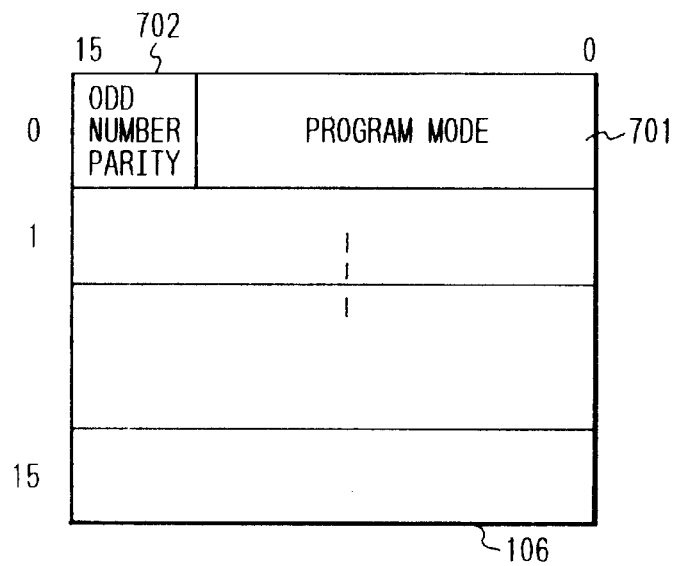
FIG. 7 is a view showing structure of NVRAM data.

FIG. 7 shows the data structure of the NVRAM 106, having a capacity of 16 words of 16 bits each, the words being addressed as 0, 1, . . . , 15. A program mode area 701 in the address 1 stores whether the control program operating currently or immediately before the turning-off of power supply of the present laser beam printer is either the main body program, or a first cartridge program 0, or a second cartridge program 1.

In the program mode, the main body program, the first cartridge program 1 and the second cartridge program 0 are respectively indicated by 'M', 'L' and 'R'. The 15th bit of the program mode area 701 constitutes an odd number parity area 702, storing an odd number parity of the program mode area 701 and used for error detection in the MVRAM write-in and read-out.

Figure 8:
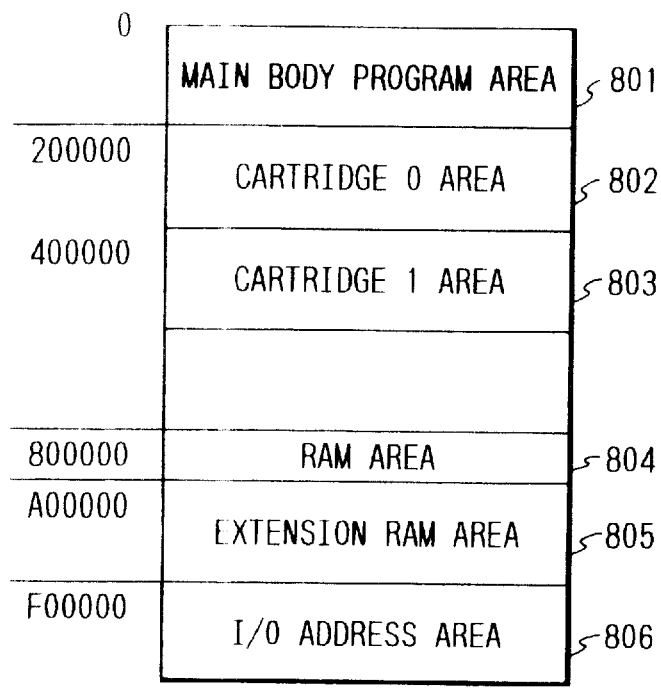
FIG. 8 is a view of an address space of a CPU.

FIG. 8 shows the address space of the CPU 100. A main body program area 801 is assigned from an address $0_{hex}$, physically corresponding to the ROM 104, and stores the information of the main body program with the storage format 200.

A cartridge 0 area 802 is assigned from an address $200000_{hex}$, physically corresponding to the ROM on the first program cartridge 109, and stores the information of the first cartridge program 0 with the storage format 250.

A cartridge 1 area 803 is assigned from an address 400000hex, physically corresponding to the ROM on the second program cartridge 110, and stores the information of the second cartridge program 1 with the storage format 250.

A RAM area 804 is assigned from an address $800000_{hex}$, physically corresponding to the RAM 105, and has the data structure shown in FIG. 5.

An extension RAM area 805 is assigned from an address $A00000_{hex}$, physically corresponding to the extension RAM card 107.

An I/O address area 806 is assigned for I/O ports to be used by the CPU for signal exchanges with various circuits of the control unit 100, such as the input interface circuit 103, the panel interface circuit 111 and the NVRAM 106.

Figure 9:
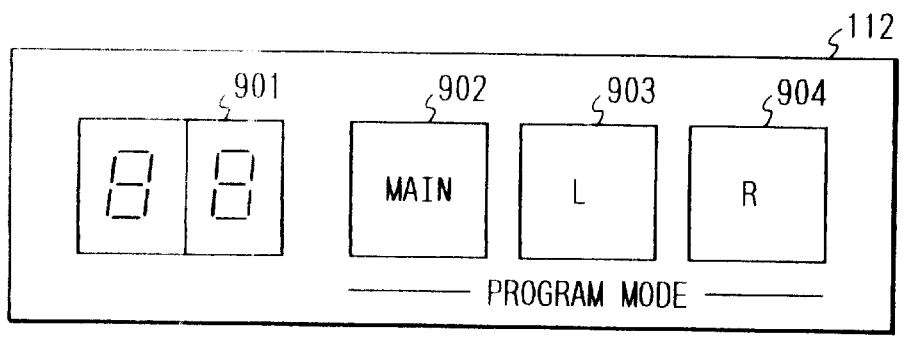
FIG. 9 is a plan view of an operation panel.

FIG. 9 illustrates the arrangement of display and switches on the operation panel 112. A status indicator 901, consisting of two digits of ordinary 7-segment LED indicators, is used for displaying the kind of control program currently under execution or the error status, according to instructions given by the control program.

Switches 902, 903, 904 are used for switching the program modes. A MAIN switch 902, an L switch 903 and an R switch 904 respectively provide requests for switching to the main body program, the cartridge program 0 and the cartridge program 1. The actuations of these switches are sensed by the CPU 101 in the course of execution of the control program, and corresponding operations are executed.

FIGS. 10, 11A, 11B and 12 are flow charts of the main body program of the above-explained laser beam printer, of which functions with the main body program will be explained in the following.

FIG. 10 is a flow chart of a start procedure 1000 of the main body program. In response to the start of power supply, the CPU 101 jumps to the main body program 211 all starting from an address $a_1$, by referring to the program start address $a_1$, of the CPU interruption vector 201.

At first a step 1001 executes a self test of the control unit 100, and steps 1002 and 1003 respectively initialize the storage area 502 and the external reference RAM area 506.

Then a step 1004 reads the program mode from the program mode area 701 of the NVRAM 106, utilizing the NVRAM read-out routine 212, and a step 1005 identifies a control program to be started. If the step 1005 identifies 'M' indicating the execution of the main body program, the sequence proceeds to a step 1006 to continue the execution of the main body program.

At first the step 1006 copies the main body interruption vector table 204 to the interruption jump table 501 on the RAM 105. Then a step 1007 initializes the free area 510 for the main body program, then a step 1008 turns off the busy signal S2 to inform the host computer that data transmission is enabled, and a step 1009 causes the status display 901 to display the program ID 202, thereby showing that the main body program is currently in execution.

Then, in a step 1010, the sequence jumps to a main routine of the main body program, shown in FIGS. 11A and 11B.

On the other hand, if the step 1005 identifies a program mode 'L', indicating a request for execution of the cartridge program 0, the sequence proceeds to a step 1011 for checking the cartridge ID code 303 of the cartridge identification area 251 of the first program cartridge 109.

A cartridge ID code 303 'PL' indicates that the program cartridge 109 has a control program for the cartridge program 0, while a code 'PB' indicates that the cartridge 109 has a control program usable for the cartridge program 0 and 1. If the code is other than 'PL' or 'PB', the switching to the cartridge program 0 is unsuitable. In such case, the sequence proceeds to the step 1006 to continue the execution of the main body program.

If the step 1011 identifies that the cartridge ID code 303 is 'PL' or 'PB', indicating that the program on the currently loaded program cartridge 109 is usable, the sequence proceeds to a step 1012 for checking the product conformity flag 253.

In this step there is discriminated whether a flag bit, corresponding to the model of the present laser beam printer, is set in the product conformity flag 253, and, if set, indicating that the program on the currently loaded cartridge 109 is usable for the present laser beam printer, the sequence proceeds to a step 1013 for jumping to an address 200000+ $\alpha_0$ on the cartridge 0 area 802, namely the cartridge program start address area 254, and further proceeds to a start procedure 1300 of the cartridge program shown in FIG. 13, according to a jump command to the address $\alpha_1$ in the area.

On the other hand, if the step 1012 identifies that the corresponding flag bit is not set in the product conformity flag 253, indicating that the cartridge program 0 is not usable for the present laser beam printer, the switching to the cartridge program 0 is interrupted and the sequence proceeds to the step 1006 to continue the execution of the main body program.

If the step 1005 identifies a program mode 'R', indicating the execution of the cartridge program 1, a step 1014 checks the cartridge ID code 303 for the program cartridge 1, then a step 1015 checks the product conformity flag 253 and a step 1016 executes a jump to an address 400000+$\alpha_0$ on the cartridge 1 area 803 in a similar manner to the steps 1011–1013 for the cartridge program 0, whereby the control of the CPU 101 is transferred to the cartridge program 1.

FIGS. 11A and 11B are flow charts of a main routine 1100 of the main body program, to which the sequence jumps from the main body program start procedure 1000 shown in FIG. 10, or from a main body program re-start procedure 1200 shown in FIG. 12.

At first a step 1101 discriminates whether any of the program mode switches 902, 903, 904 has been depressed, and, if not, steps 1101–1108 are repeatedly executed.

At first a step 1102 discriminates whether data are present in the reception buffer, and the sequence awaits the setting of the input data from the host computer into the reception buffer, repeating the switch checking in the step 1101.

If data are present in the reception buffer, a step 1103 fetches the data from the buffer and analyzes whether the data are a command or a character code. In case of a font selection command, the designated value is stored in the selected font area 512, and, in case of a copy number designating command, the designated value is stored in the copy number area 513.

If the data are a character code, a step 1104 selects a corresponding font area 214 or 265 based on the identification code in the selected font area 512, then develops a corresponding character dot pattern on the page buffer 517, and simultaneously turns on the data flag 515, thus indicating the presence of printing data on the page buffer 517. Then the sequence proceeds to a step 1105, and the steps 1101–1105 are repeated until the analysis of data of a page is completed.

Upon completion of data analysis of a page, a step 1106 sends the image data of the page buffer 517 to the image signal generator 113, thereby causing the printing mechanism unit 115 to effect the printing operation. Then a step 1107 causes the step 1106 to be repeated by a number of copies indicated by the copy number area 513.

After the printing operations by the copy number, a step 1108 turns off the data flag 515, thereby indicating the absence of printing data on the page buffer 517, and the sequence returns to the step 1101.

In case the step 1101 identifies that any of the program mode switches 902, 903 and 904 is depressed, the sequence proceeds to a program switching procedure starting from a step 1109.

The step 1109 turns on the busy signal S2, thereby requesting the host computer 102 to terminate the data transmission.

Then a step 1110 checks the data flag 525. If the flag is on, indicating the presence of printing data in the page buffer 517, the switching of program is not acceptable so that a step 1120 displays an error message on the status display unit 901. Then a step 1121 resets the busy signal S2 and the sequence returns to the step 1101.

On the other hand, if the data flag 515 is off, a step 1111 discriminates which program mode switch has been depressed.

In case the MAIN switch 902 is depressed, this depression is considered ineffective because the main body program is already in execution. Thus, after the error message display in the step 1120 and the resetting of the busy signal S2 in the step 1121, the sequence returns to the step 1101.

In case the L switch 903 is depressed, the sequence proceeds to a step 1112 to enter a procedure of switching to the cartridge program 0. Steps 1112 and 1113 check the cartridge ID code 303 and the product conformity flag 253 in the same manner as in the aforementioned steps 1011, 1012, and, if the results of these checks are acceptable, a step 1114 copies the contents of the operation mode table 511 and the reception buffer 516 to the main body storage area 503. Then a step 1115 transfer the control of the CPU 101 to the cartridge program 0 starting through an address $200000+\alpha_0$.

If the result of check in the step 1112 or 1113 is not acceptable, the step 1120 displays the error message on the status display unit 901, then the step 1121 resets the busy signal S2 and the sequence returns to the step 1101.

In case the step 1111 identifies that the R switch 904 is depressed, there is initiated a procedure for switching to the cartridge program 1, starting from a step 1116. This procedure is conducted on the second program cartridge 110, in a simialr manner as the steps 1112–1115 for the cartridge program 0. There are executed a step 1116 for checking the cartridge ID code 303, a step 1117 for checking the product conformity flag 253, a step 1118 for copying the operation mode table 511 and the reception buffer 516 in the main body storage area, and a step 1119 for transferring the control of the CPU 101 to the cartridge program 1 starting through an address $400000+\alpha_0$.

FIG. 12 is a flow chart of a main program re-start procedure 1200 for transferring the control of the CPU 101 from the cartridge program to the main body program.

The re-start procedure is initiated by a jump from the cartridge program to an address $b_0$ of the main body program. At first a step 1201 refers to the area of address $b_0$, namely the main body program re-start address area 203, and executes a jump to the actual address $b_1$ of the re-start procedure, thus entering the re-start procedure from a step 1202. The step 1202 copies anew the main body interruption vector table 204 in the interruption jump table 501 which has stored the interruption vector table 255 for the cartridge program.

Then a step 1203 re-initializes the free area 510, which has been used for the cartridge program, for the main body program, and a step 1204 copies the information, which was stored in the main body storage area 503 in the steps 1114 and 1118 at the previous switching from the main body program to the cartridge program, in a predetermined area in the free area 510.

Then a step 1205 turns off the busy signal S2, thereby informing the host computer 102 that the data transmission is enabled, and a step 1206 displays the program ID 202 on the status display unit 501, thus indicating that the main body program is again in execution. Then a step 1207 stores a program mode 'M' (execution of main body program) in the program mode area 701 of the NVRAM 106 by means of the NVRAM write-in routine, and the sequence proceeds in a step 1208 to the main routine 1100 of the main body program.

FIGS. 13, 14A and 14B are flow charts showing an example of the cartridge program on the program cartridge.

FIG. 13 is a flow chart of a start procedure 1300 of the cartridge program. After jumping from the main body program or the other cartridge program to a relative address $\alpha_0$ from the top of the cartridge area 802 or 803 (step 1115, 1119 or 1411), a step 1301 refers to the cartridge start address area 254 at the address $\alpha_0$ and makes a jump to a real address $\alpha_1$, for the start procedure, starting from a step 1302.

The step 1302 checks the program ID 202 of the main body, and, if it is a predetermined program ID indicating that the present cartridge program matches the main body program, a step 1303 checks the memory capacity. A particular cartridge program requiring the extension RAM card 107 is checked in this step.

If the memory capacity is acceptable, a step 1304 copies the interruption vector table 253 for the cartridge program in the interruption jump table 501 on the RAM 105.

Then a step 1305 initializes the free area 510 for the cartridge program.

Then a step 1306 checks the ID 601 stored in the cartridge storage area (cartridge 0 storage area 504 in case of cartridge program 0, or cartridge 1 storage area 505 in case of cartridge program 1), and, if the storage ID 601 is empty (as initialized), the sequence jumps to a step 1310.

In case the step 1306 identifies that the storage ID 601 coincides with the cartridge ID number 304 of the cartridge program currently under execution, the content of the storage area represents the information of the cartridge program stored immediately before the previous switching from the cartridge program to the main body program, so that the sequence proceeds to a step 1307 to return the content of the cartridge storage area 504 or 505 to a predetermined position in the free area 510.

On the other hand, in case the step 1306 identifies that the storage ID 601 does not coincide with the cartridge ID number 304, indicating that the currently executed cartridge program has been changed from and is different from the program cartridge used at the preceding information storage in the cartridge storage area 504 or 505, a step 1308 displays an error message on the status display unit 901, then a step 1309 awaits the depression of any of the switches 902, 903, 904 on the operation panel 112, and the sequence then jumps to a step 1310.

The step 1310 turns off the busy signal S2 to inform the host computer 102 that the data transmission is enabled, then a step 1311 displays the cartridge ID number 304 on the status display unit, a step 1312 stores a program mode 'L' (or 'R') in the program mode area 703 of the NVRAM 106 by means of the NVRAM write-in routine, and the sequence proceeds from a step 1313 to the main routine 1400 of the cartridge program.

If the result of check in the step 1302 or 1303 is not acceptable, a step 1314 displays an error message on the status display unit 901, then a step 1315 awaits the depression of any of the switches 902, 903, 904 on the operation panel 112, and a step 1316 makes a jump to the start address, $a_1$ of the main body program.

FIGS. 14A and 14B show an example of the main routine of the cartridge program. For the purpose of clarity, there is shown the main routine 1400 of the cartridge program 0.

At first a step 1401 discriminates whether any of the program mode switches 902, 903, 904 has been depressed, and, if not, steps 1401 to 1406 are repeatedly executed.

A step 1402 discriminates whether data are present in the reception buffer, and, if not, the sequence awaits the setting of the input data from the host computer into the reception buffer, repeating the switch check of the step 1401.

If data are present in the reception buffer, a step 1403 fetches the data from the reception buffer and analyzes the data based on a command system different from that of the main body program, thereby identifying whether the data are a command or a character code. In case of a font selection command, a designated value is stored in the selected font area 512, and, in case of a copy number designating command, a designated value is stored in the copy number area 513.

In case of a character code, based on the identification code in the selected font area 512, a corresponding font area 258 is selected, and a corresponding character dot pattern is developed on the page buffer 517. Thus steps 1401–1404 are repeated until the completion of data analysis of a page is identified in a step 1404.

Upon completion of data analysis of a page, a step 1405 sends the image data on the page buffer 517 to the image signal generator 113, thereby causing the printing mechanism unit 115 to effect the printing operation. Then a step 1406 causes the step 1405 to be repeated by a number of copies indicated by the copy number area 513. Upon completion of printing of copies of the designated number, the sequence returns to the step 1401.

In case the step 1401 identifies that any of the program mode switches 902, 903, 904 is depressed, the sequence proceeds to a program switching procedure starting from a step 1407.

The step 1407 discriminates which program mode switch has been depressed, and, if the 'L' switch 903 is depressed, this depression is considered ineffective because the requested cartridge program 0 is already in execution, and the sequence returns to the step 1401.

In case the 'R' switch 904 is depressed, the sequence proceeds to a step 1408 to enter a procedure of switching to the cartridge program 1. As in the step 1101 of the main body program, a step 1408 checks the cartridge ID code 303, thereby discriminating whether an effective cartridge program is present at the cartridge connector 1502. If present, a step 1409 records the cartridge ID number 304 of the presently executed cartridge program 0 in the storage ID area 601 of the cartridge 0 storage area 504, and a step 1410 copies the contents of the operation mode table 511 in the free area 510 and the reception buffer 516 into the cartridge 0 storage area 504.

Then a step 1411 transfers the control of the CPU 101 to the cartridge program 1 starting through an address 400000+ $\alpha_0$. If the step 1408 cannot identify the presence of an effective cartridge program, the sequence returns to the step 1401.

In case the step 1407 identifies that the MAIN switch 902 is depressed, steps 1412, 1413 copy the cartridge ID number 304 and the necessary information of the free area 510 into the cartridge 0 storage area 504 in a similar manner as in the aforementioned steps 1409, 1410, and a step 1414 makes a jump to a main body program re-start procedure 1200 starting through the address $b_0$.

As explained in the foregoing, in the present embodiment, the currently executed one among the main body program and the cartridge programs 0, 1 detects a request for program switching by checking the state of requesting switches, and the program switching is achieved by transferring the control of the CPU to a start (re-start) address of the requested program from a storage address fixed for said program.

Also in said embodiment, the data flag 515 is set when image data are written in the page buffer 517 and the flag is reset when the output of image data from the page buffer 517 is completed, so that the data flag 515 is turned on while the page buffer contains data to be printed or under printing.

In case a request for program switching is generated by the switches 902, 903, 904, the state of the data flag 515 is detected, and, if data to be printed still remain in the page buffer, the switching of the control program is suspended in order to prevent the loss of the remaining data to be printed. Also in such case, an alarm message is displayed on the display unit 901 to inform the operator of the suspension of the requested program switching, thereby requesting an alternative measure.

Also in the embodiment, upon detection of a program switching by the requesting switches, the busy signal S2 to the host computer is turned on thereby requesting the host computer to interrupt the data transmission. It is therefore rendered possible to prevent the loss of data entered from the host computer in the course of start procedure of a newly switched control program.

Also in this embodiment, the detachable program cartridge contains a product conformity flag 253, of which bits are assigned flags respectively indicating the adaptability of the program of the cartridge to different product models. Thus, when the program cartridge is mounted on the main body of the printer, the main body program can discriminate whether the program is usable for the printer, by checking the flag bit, in the product conformity flag 253 of the cartridge, corresponding to the model of the printer.

As the product conformity flag 253 consists of plural independent flag bits, the program cartridge may be used for plural product models by setting flags in the corresponding plural bits.

On the other hand, a program ID 202 is provided as a discriminator on the main body of the printer, thus uniquely naming each product model. Thus the program of the cartridge can discriminate whether the cartridge matches the main body of the printer on which the cartridge is mounted, by checking the program ID 202. This structure is particularly effective, for example, for preventing the erroneous use of a general-purpose program cartridge on a printer of limited purpose which is identical in the hardware structure with the general-purpose printer but is different in the main body program. Furthermore, in the present embodiment, an alarm message is displayed on the status display unit if the program cartridge does not match the main body.

Embodiment 2

In the foregoing embodiment, the destination of jump at the switching from the main body program to the cartridge program is fixed to the relative address $\alpha_0$. However it is also possible to store the start address of the cartridge program in an area of which relative position is fixed from the cartridge identification area.

This structure allows to store plural control programs on a program storage medium and to select each of the plural programs by searching the cartridge identification code in the cartridge identification area.

Also in the first embodiment the request for program switching is given by switches on the operation panel, but it may also be given by a command from the host computer. Also the request has been limited to the switching to the main body program or the program cartridge 0 or 1, but it may be given by a unique name utilizing the program ID or the cartridge ID code.

In the first embodiment, an external request for switching is detected by requesting switches, but there may be used an internal request for program switching, such as the switching of control means in case an abnormality is detected in any unit of the apparatus by abnormality detecting means.

Furthermore, in the first embodiment, the control means consists of a control program giving control information to the CPU, but there may also be used an electrical control circuit. In this case the switching control is conducted by electrical signals, instead of the control flow of program.

Embodiment 3

In the first embodiment, the presence or absence of data remaining in the page buffer is taken as the condition enabling the program switching and detecting means for such data are provided for this purpose. The present invention is however not limited to such embodiment, and, for example, the presence or absence of data on the reception buffer may also be taken as the condition for program switching.

Such structure allows to prevent the breakage of continuously transmitted data of plural pages, by the switching of the control program.

Furthermore, the condition for program switching is not limited to the presence or absence of remaining data, but the sheet transport state on the printing mechanism may be used for this purpose, and the program switching may be enabled after the printing sheet is completely discharged. Thus, even when the new switched control program temporarily stops the functions of the printing mechanism for initialization, the sheet printed immediately before will not be damaged.

Embodiment 4

In the first embodiment, means for informing the data source of the program switching consists of a protocol busy signal, namely a signal requesting termination of data transmission. However the present invention is not limited to such embodiment, and there may be provided an independent exclusive information signal between the data source and the apparatus, thereby informing the data source of the use of the switching means.

In this case the data source can uniquely detect the switching of the control program, so that the data source can instruct the operator to exchange the data file or the printer driver dependent on the control program. Particularly if the information signal is so designed as to include code information, the printer apparatus can inform the switched program by its unique identification name, thereby enabling automatic exchange of the printer driver or data file in the data source.

Furthermore, there may be provided means for responding to the information of program switching from the printer apparatus. Thus in case the switching of control program is informed to the data source, it can discriminate whether a group of data is being transmitted and, if such transmission is being executed, can transmit a response for refusing such program switching to the printing apparatus, thereby preventing the interruption of a serial printing operation.

Embodiment 5

In the first embodiment, the program cartridge is rendered usable commonly for different product models which are different in the main body program but are same in the hardware structure and in the external reference routines of the main body program, by setting all the corresponding bits of the product conformity flag. Furthermore, even in the product models which are different in the hardware structure or in the external reference routines, the program on the program cartridge may be so designed as to branch the control program into plural control flows, according to the hardware structure and the available external reference routines of each model, by checking the discriminator such as the program ID of the main body. In this manner the program cartridge can be made usable in wider range of product models.

As explained in the foregoing, the present invention provides following advantages:

(1) Switching among plural control programs is rendered possible, by the use of plural detachable program storage media. There are thus realized, within a single apparatus, adaptability to different command systems, various additional functions, and various hand-shake supports with the host computer.

Also in case an error is found in the incorporated control program, correction can be easily made by providing a corrected program with a detachable medium such as a control cartridge.

Furthermore, presence of means for accepting an independent control ensures compatibility among plural control programs.

(2) At the switching of control program, there is detected whether the apparatus is in a state capable of such program switching, and such program switching is suspended in the presence of an unsuitable factor, so that there can be prevented loss of data or troubles in the apparatus.

(3) Switching of the control program is informed to the data source immediately before the switching, so that the damage to the data from the data source can be prevented.

(4) The currently operating control program checks the identification signal of the program stored in a newly mounted detachable memory medium, whereby only the matching control program can be allowed to operate.

Particularly the program of the detachable memory medium is given plural independent identification signals for judging the matching with different models of the apparatus, so that the matching can be judged over the present and future models and the control program can be commonly used among plural models without any danger.

We claim:

1. An output apparatus for generating and outputting output information from input information entered from an information processing apparatus, said output apparatus comprising:

discrimination means for discriminating whether or not external memory means for storing a control program is adaptable for said output apparatus; and control means for controlling switching from a first control program, which is for generating output information from input information stored in said output apparatus, to a second control program, which is for generating output information from input information stored in external memory means detachably connected to said output apparatus, in response to a discrimination result provided by said discrimination means.

2. An apparatus according to claim 1, wherein said input information in character code.

3. An apparatus according to claim 1, wherein said output information is image data.

4. An apparatus according to claim 1, wherein the control programs are each programs which interpret said input information and produce output information.

5. An apparatus according to claim 1, wherein said memory means is an image buffer for storing said output information.

6. An apparatus according to claim 1, wherein when said discrimination means discriminates that said external memory means is adaptable for said output apparatus, the switching from the first control program to the second control program is permitted.

7. An apparatus according to claim 1, wherein when said discrimination means discriminates that said external memory means is not adaptable for said output apparatus, the switching from the first control program to the second control program is inhibited.

8. An output apparatus for generating and outputting output information from input information entered from an information processing apparatus, said output apparatus comprising:

discrimination means for discriminating whether or not switching from a first control program, which is for generating output information from input information stored in said output apparatus, to a second control program, which is for generating output information from input information stored in external memory means detachably connected to said output apparatus, is indicated; and control means for controlling said output apparatus to output to said information processing apparatus an interrupt signal for interrupting entry of said input information when said discrimination means discriminates that the switching is indicated.

9. An apparatus according to claim 8, wherein said input information is character code.

10. An apparatus according to claim 8, wherein said output information is image data.

11. An apparatus according to claim 8, wherein the control programs are each programs which interpret said input information and produce output information.

12. An apparatus according to claim 8, wherein said memory means is an image buffer for storing said output information.

13. An apparatus according to claim 8, wherein said signal is a busy signal.

14. A method for generating and outputting, by an output apparatus, output information from input information, entered from an information processing apparatus, comprising the steps of:

discriminating whether or not external memory means for storing a control program is adaptable for the output apparatus; and controlling switching from a first control program, which is for generating output information from input information stored in the output apparatus to a second control program, which is for generating output information from input information stored in external memory means detachably connected to the output apparatus, in response to a discrimination result obtained in said discriminating step.

15. A method according to claim 14, wherein the input information in character code.

16. A method according to claim 14, wherein the output information is image data.

17. A method according to claim 14, wherein the control programs are each programs which interpret the input information and produce output information.

18. A method according to claim 14, wherein the memory means is an image buffer for storing the output information.

19. A method according to claim 14, wherein, when it is discriminated in said discriminating step that the external memory means is adaptable for the output apparatus, the switching from the first control program to the second control program is permitted.

20. A method according to claim 14, wherein, when it is discriminated in said discriminating step that the external memory means is not adaptable for the output apparatus, the switching from the first control program to the second control program is inhibited.

21. A method for generating and outputting output information from input information, entered from an information processing apparatus, comprising the steps of:

discriminating whether or not switching from a first control program, which is for generating output information from input information stored in the output apparatus, to a second control program, which is for generating output information from input information stored in external memory means detachably connected to the output apparatus, is indicated; and controlling the output apparatus to output to the information processing apparatus an interrupt signal for interrupting entry of the input information when it is discriminated in said discriminating step that the switching is indicated.

22. A method according to claim 21, wherein the input information is character code.

23. A method according to claim 21, wherein the output information is image data.

24. A method according to claim 21, wherein the control programs are each programs which interpret the input information and produce output information.

25. A method according to claim 21, wherein the memory means is an image buffer for storing the output information.

26. A method according to claim 21, wherein the signal is a busy signal.

27. A memory medium which stores a program, which when loaded into a programmable apparatus, causes the programmable apparatus to perform a method for generating and outputting, by an output apparatus, output information from input information, entered from an information processing apparatus, comprising the steps of:

discriminating whether or not external memory means for storing a control program is adaptable for the output apparatus; and controlling switching from a first control program, which is for generating output information from input information and which is stored in the output apparatus, to a second control program, which is for generating output information from input information and which is stored in external memory means detachably connected to the output apparatus in response to a discrimination result obtained in said discriminating step.

28. A memory medium according to claim 27, wherein the input information in character code.

29. A memory medium according to claim 27, wherein the output information is image data.

30. A memory medium according to claim 27, wherein the control programs are each programs which interpret the input information and produce output information.

31. A memory medium according to claim 27, wherein the memory means is an image buffer for storing the output information.

32. A memory medium according to claim 27, wherein, when it is discriminated in said discriminating step that the external memory means is adaptable for the output apparatus, the switching from the first control program to the second control program is permitted.

33. A memory medium according to claim 27, wherein, when it is discriminated in said discriminating step discriminates that the external memory means is not adaptable for the output apparatus, the switching from the control program is inhibited.

34. A memory medium which stores a program, which when loaded into a programmable apparatus, causes the programmable apparatus to perform a method for generating and outputting output information from input information, entered from an information processing apparatus, comprising the steps of:

discriminating whether or not switching from a first control program, which is for generating output information from input information and which is stored in the output apparatus, to a second control program, which is for generating output information from input information and which is stored in external memory means detachably connected to the output apparatus, is indicated; and controlling the output apparatus to output to the information processing apparatus an interrupt signal for interrupting entry of the input information when it is discriminated in said discriminating step that the switching is indicated.

35. A memory medium according to claim 34, wherein the input information is character code.

36. A memory medium according to claim 34, wherein the output information is image data.

37. A memory medium according to claim 34, wherein the control programs are each programs which interpret the input information and produce output information.

38. A memory medium according to claim 34, wherein the memory means is an image buffer for storing the output information.

39. A memory medium according to claim 34, wherein the signal is a busy signal.

40. A program product, which when loaded into a programmable apparatus, causes the programmable apparatus to perform a method for generating and outputting, by an output apparatus, output information from input information, entered from an information processing apparatus, comprising the steps of:

discriminating whether or not external memory means for storing a control program is adaptable for the output apparatus; and controlling switching from a first control program, which is for generating output information from input information and which is stored in the output apparatus, to a second control program, which is for generating output information from input information and which is stored in external memory means detachably connected to the output apparatus, in response to a discrimination result obtained in said discriminating step.

41. A program product according to claim 40, wherein the input information in character code.

42. A program product according to claim 40, wherein the output information is image data.

43. A program product according to claim 40, wherein the control programs are each programs which interpret the input information and produce output information.

44. A program product according to claim 40, wherein the memory means is an image buffer for storing the output information.

45. A program product according to claim 40, wherein, when it is discriminated in said discriminating step that the external memory means is adaptable for the output apparatus, the switching from the first control program to the second control program is permitted.

46. A program product according to claim 40, wherein, when it is discriminated in said discriminating step that the external memory means is not adaptable for the output apparatus, the switching from the first control program to the second control program is inhibited.

47. A program product, which when loaded into a programmable apparatus, causes the programmable apparatus to perform a method for generating and outputting output information from input information, entered from an information processing apparatus, comprising the steps of:

discriminating whether or not switching from a first control program, which is for generating output information from input information and which is stored in the output apparatus, to a second control program, which is for generating output information from input information and which is stored in external memory means detachably connected to the output apparatus, is indicated; and controlling the output apparatus to output to the information processing apparatus an interrupt signal for interrupting entry of the input information when it is discriminated in said discriminating step that the switching is indicated.

48. A program product according to claim 47, wherein the input information is character code.

49. A program product according to claim 47, wherein the output information is image data.

50. A program product according to claim 47, wherein the control programs are each programs which interpret the input information and produce output information.

51. A program product according to claim 47, wherein the memory means is an image buffer for storing the output information.

52. A program product according to claim 47, wherein the signal is a busy signal.

53. An apparatus according to claim 1, further comprising printing means for printing the output information.

54. An apparatus according to claim 1, further comprising designating means for designating the switching from the control program.

55. An apparatus according to claim 8, further comprising printing means for printing the output information.

56. An apparatus according to claim 8, further comprising designating means for designating the switching from the control program.

57. A method according to claim 14, further comprising the step of printing the output information.

58. A method according to claim 14, further comprising the step of designating the switching from the control program.

59. A method according to claim 21, further comprising the step of printing the output information.

60. A method according to claim 21, further comprising the step of designating the switching from the control program.

* * * * *

UNITED STATES PATENT AND TRADEMARK OFFICE
CERTIFICATE OF CORRECTION

PATENT NO. : 5,878,275
DATED : March 2, 1999
INVENTOR(S) : KUNIO OKADA, ET AL.

It is certified that error appears in the above-identified patent and that said Letters Patent is hereby corrected as shown below:

IN THE DRAWINGS

Sheet 1, FIG. 1, "EXETENSION" should read --EXTENSION--.

COLUMN 4

Line 41, "card 307" should read --card 107--.

COLUMN 6

Line 44, "difference" should read --different--.

COLUMN 7

Line 40, itnerruption" should read --interruption--.

COLUMN 8

Line 32, "following" should read --the following--; and
Line 65, "400000hex," should read --$400000_{hex}$,--.

COLUMN 11

Line 26, "transfer" should read --transfers--.

COLUMN 16

Line 6, "following" should read --the following--; and
Line 59, "in" should read --is--.

UNITED STATES PATENT AND TRADEMARK OFFICE
CERTIFICATE OF CORRECTION

PATENT NO.   : 5,878,275
DATED        : March 2, 1999
INVENTOR(S)  : KUNIO OKADA, ET AL.

It is certified that error appears in the above-identified patent and that said Letters Patent is hereby corrected as shown below:

COLUMN 17

Line 55, "in" should read --is--.

COLUMN 18

Line 49, "in" should read --is--;
   Line 64, "discrimi-" should be deleted; and
   Line 65, "nates" should be deleted.

COLUMN 19

Line 50, "in" should read --is--.

Signed and Sealed this

Twenty-eighth Day of December, 1999

Attest:

Q. TODD DICKINSON

Attesting Officer

Acting Commissioner of Patents and Trademarks